US012340779B2

(12) United States Patent
Crocken et al.

(10) Patent No.: US 12,340,779 B2
(45) Date of Patent: Jun. 24, 2025

(54) DRUM PEDAL AND PEDAL MODULE FOR ENHANCED DRUMMING

(71) Applicant: John Crocken, Baltimore, MD (US)

(72) Inventors: John Crocken, Baltimore, MD (US); Jack Lawrence, Rosedale, MD (US)

(73) Assignee: John Crocken, Baltimore, MD (US)

( * ) Notice: Subject to any disclaimer, the term of this patent is extended or adjusted under 35 U.S.C. 154(b) by 0 days.

(21) Appl. No.: 18/369,363

(22) Filed: Sep. 18, 2023

(65) Prior Publication Data

US 2025/0095615 A1 Mar. 20, 2025

(51) Int. Cl.
*G10D 13/11* (2020.01)

(52) U.S. Cl.
CPC .................................... *G10D 13/11* (2020.02)

(58) Field of Classification Search
CPC ...................................................... G10D 13/11
See application file for complete search history.

(56) References Cited

U.S. PATENT DOCUMENTS 505,825 A * 10/1993 Gendron .................. B62M 3/08 74/594.4
2,800,828 A * 7/1957 Moeller ................. G10D 13/11 84/422.1
4,235,146 A * 11/1980 Purdy .................... G10D 13/11 84/422.1

* cited by examiner

*Primary Examiner* — Jianchun Qin
(74) *Attorney, Agent, or Firm* — Jansson Munger & McKinley Ltd.

(57) ABSTRACT

Drum pedal apparatus which, in addition to the essential or typical mechanical structure, has a footboard structure having a main-portion upper surface and a plurality of roller balls rotatably mounted within the thickness of the main portion and each presenting a spherical cap, thereby providing a pedal-pushing surface including the roller-ball spherical caps. The invention is also a drum-pedal module for affixing onto the footboard of standard drum pedal apparatus, the module having a module main portion, the plurality of roller balls as described above, and pedal-affixation structure on or along the module main portion.

18 Claims, 10 Drawing Sheets

DRUM PEDAL AND PEDAL MODULE FOR ENHANCED DRUMMING

FIELD OF THE INVENTION

This invention relates to the field of musical drums and more specifically to drum pedals and devices to improve drummers' operation of pedal-operated drums.

BACKGROUND AND OBJECTS OF THE INVENTION

In addition to manual drum-beating using handheld drumsticks on one or more drum surfaces, experienced drummers frequently also use larger foot-operated drums, (e.g., bass drums), beating such drums by means of a pedal apparatus set in a fixed position beside the vertical drum surface of the drum being used.

As is known in the field of drums, in order to facilitate the playing of such foot-operated drums, it is important that the drum pedals have good overall performance, including sufficient response to pedal operation by the drummer's foot. Development in the field of drummers' foot pedals has largely concentrated on the ability of pedal apparatus to quickly transmit foot movement (such as the depressing of a foot pedal to beat the drum) and for the pedal apparatus to quickly recover from the striking motion to its ready position for subsequent drum beats.

While significant progress has been made in pedal apparatus to improve the repetitive beating-recovering movements, there has been a need for improvement in how the drummer's pedal-engaging foot can initiate the repetitive drumming motion by means of the foot pedal. Enhancement of speed in high-speed repetitive foot drumming is an important objective to drummers, and it is to improvement on this important perceived need that the present invention is directed.

It is an object of the present invention to provide a drum pedal and a drum pedal module for increasing the speed with which drummers can cause pedal-actuated bass drum beating and/or to increase the ease with which high-frequency pedal-actuated drum beating can occur, including over a continuous uninterrupted period.

These and other objects of the invention will be apparent from the following descriptions and from the drawings.

SUMMARY OF THE INVENTION

The present invention is an improved drum pedal apparatus and also a drum-pedal module for affixing onto the footboard of a drum pedal. The drum pedal and drum-pedal module of this invention provide the advantages referred to above.

Referring first to the inventive drum pedal apparatus, in many embodiments the invention is an improvement of drum pedal apparatus already in wide use in the music field. Such widely-used drum pedal apparatus include, among other things: a base for placement or mounting on the floor or outdoor surface where a drummer is playing a bass drum; a footboard depressably-mounted with respect to the base and movable between up and down positions by the drummer's foot; an axle support forward of the footboard and having a striker axle journaled therein for rotation by linkage to the footboard; a beater stem affixed to the striker axle and extending to a beater at its distal end; and spring apparatus of various kinds which is configured and arranged to bias the footboard to non-depressed positions and the beater to non-striking positions.

The improvement of such structure that characterizes the present invention has the footboard comprising: a footboard structure that includes a main portion with a thickness and an upper surface; and a plurality of roller balls, which are spherical, rotatably mounted within the thickness of the main portion, in a manner such that each presents a spherical cap, thereby providing a pedal-pushing surface which includes the roller-ball spherical caps.

In highly preferred embodiments, for each roller ball, less than the radius of the roller ball extends beyond the main-portion upper surface, such that the spherical caps are less than hemispheres, a factor which contributes to the roller ball's containment in its mounting within the thickness of the main portion of the footboard structure. It has been found that in particularly preferred embodiments, for each roller ball, about half or less than about half of the radius of the roller ball extends beyond the main-portion upper surface therearound.

In any of such patterns or otherwise, it is preferred that each of the roller balls has a diameter within the range of about 5-15 mm, and more preferred that each of the roller balls has a diameter within the range of about 6-10 mm.

In such embodiments, it is highly preferred that, for each roller ball, the portion of its radius extending beyond the main-portion upper surface therearound be about 2 mm.

In highly preferred embodiments, the roller balls are free-rolling balls, sometimes called omnidirectional balls, such that they roll freely as directed by foot contact without regard to any axis of rotation.

The main-portion upper surface of the footboard structure, of course, includes a ball-of-the-foot portion, and in highly preferred embodiments the plurality of roller balls are positioned at such ball-of-the-foot portion. In such embodiments, it is preferred that the roller balls be arranged in a two-dimensional pattern extending across and fore and aft along the ball-of-the-foot portion.

While not a requirement, it is preferred that the roller balls of the pattern be substantially equal in size to one another, that the spherical caps have their broadest cross-dimensions substantially equal in size to one another, and that each roller ball is spaced from each of its adjacent roller balls by a substantially equal distance no more than slightly exceeding the broadest cross-dimension of the spherical caps.

Also, while not a requirement, in one preferred arrangement the roller-ball pattern includes an offset arrangement of roller balls. (The term "offset arrangement" is defined below.) In such embodiments, it is preferred that the roller-ball pattern have nine roller balls in a diamond pattern with a central fore-aft linear row of three roller balls.

In another aspect of the invention is a drum-pedal module for affixing onto the footboard of drum pedal apparatus. Such module preferably includes a main portion for placing across the footboard, the main portion having a thickness and a module upper surface, pedal-affixation structure on or along the module main portion, a plurality of roller balls rotatably mounted within the thickness of the main portion and each presenting a spherical cap, thereby providing a pedal-pushing surface.

In such drum-pedal module, the preferred roller ball characteristics, their relationships with respect to the surrounding upper surface and their preferred placement, their free-rolling nature, and their preferred pattern and patterns are all as already described above, and so will not be repeated here.

However, other aspects of such inventive drum pedal should be described in this summary section. In a highly preferred embodiment, the pedal-affixation structure of such module includes a pair of flanges projecting downwardly from the module main portion in position to extend along opposite lateral edges of the footboard, and fasteners extend inwardly from the flanges toward the lateral edges of the standard footboard in order to affix the module to such footboard. A preferred form of easy-to-use fasteners are set screws which may be readily used to sandwich the module securely on top of the standard footboard.

In another preferred embodiment, the pair of aforementioned flanges of the pedal-affixation structure are integrally formed with the module main portion.

Yet another aspect of this invention is a drum-pedal module for affixing onto the standard footboard of the drum pedal apparatus, such module being like the module already described above, but having a plurality of rotation elements rotatably mounted within the thickness of the main portion and each presenting an exposed rotating surface at a level above the upper surface of the main portion. This provides a pedal-pushing surface that is a combination of the exposed rotating surfaces of the rotation elements. While the inventor verily believes that such rotation elements may have the full rotational freedom of omnidirectional spherical roller balls, they suffice to provide the advantages of the invention.

The term "spherical cap" is the portion of a sphere lying above a given plane or surface. In this document, the term "spherical cap" refers to the exposed portion of a roller ball projecting above the surrounding upper surface of the main portion of the footboard structure.

In describing the instant invention, the term "pedal-pushing surface" means the roller-balls' spherical caps surrounded by the upper surface of the main portion of the footboard structure.

The term "ball of the foot" as used herein means the metatarsophalangeal joints (MTP joints), i.e., the area where the toes attach to the foot. In this document, the term "ball-of-the-foot portion" refers to the surface of the foot most used in depressing a drum pedal.

The term "no more than slightly exceeding," as used herein with reference to the equal spacing of roller balls adjacent to one another in a pattern of roller balls, means that the engagement of the roller balls (each in their respective ball-encasement structure) with the main portion of the drum-pedal module is such that structurally sound engagement with the main portion is achieved, particularly if the engagement is by insertion into holes formed in the main portion of the module.

The term "offset arrangement" as used herein with reference to a pattern of roller balls means that the plurality of roller balls in a pattern exceeding two roller balls, rather than being arranged randomly or in some other specific arrangement, is arranged such that every roller ball is in at least one equilateral triangle arrangement with two of its nearest-neighbor roller balls that are adjacent to one another.

DETAILED DESCRIPTION OF PREFERRED EMBODIMENTS

Figure 1:
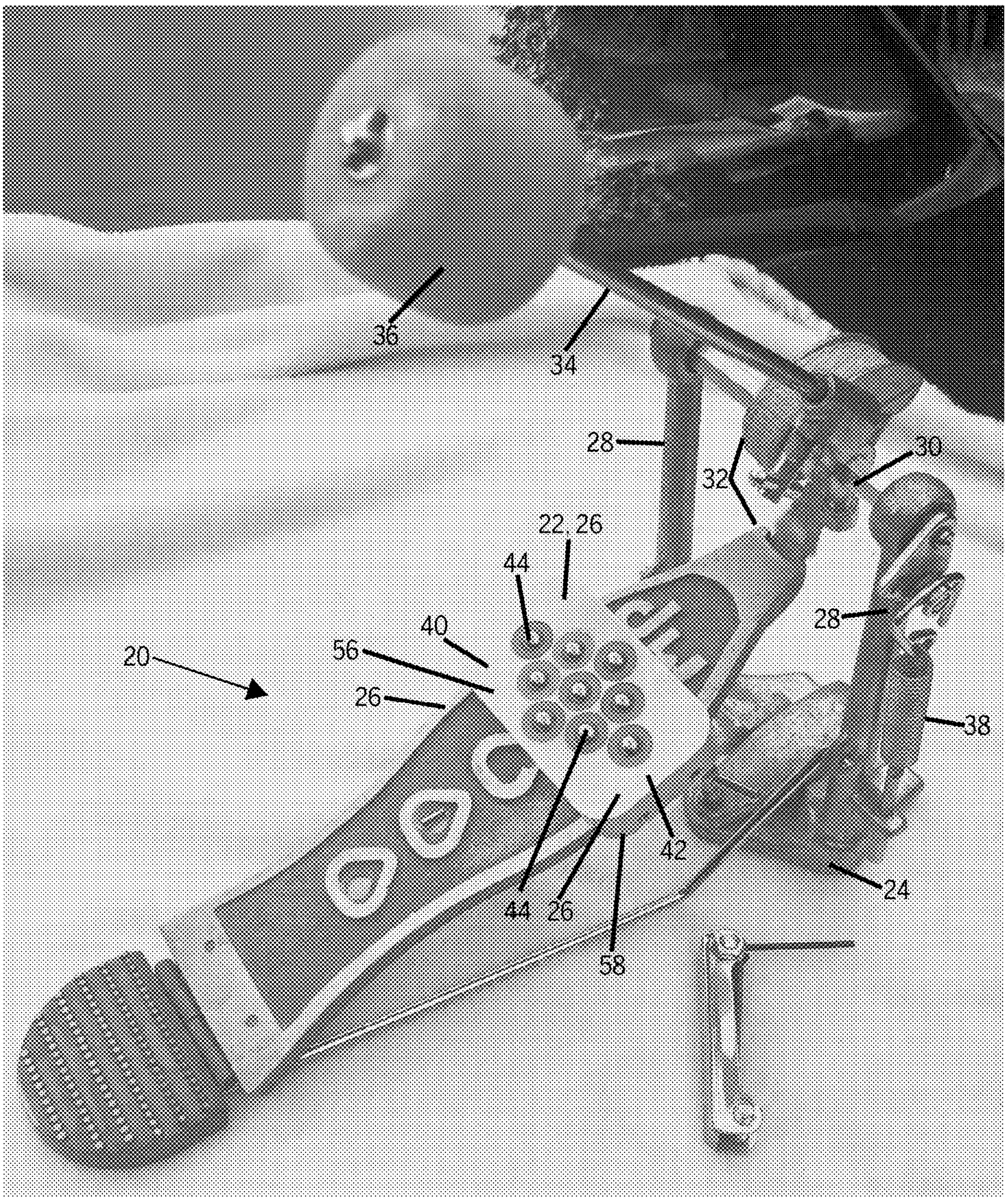
FIG. 1 is photograph showing a perspective view of the drum pedal apparatus of this invention.
Figure 2:
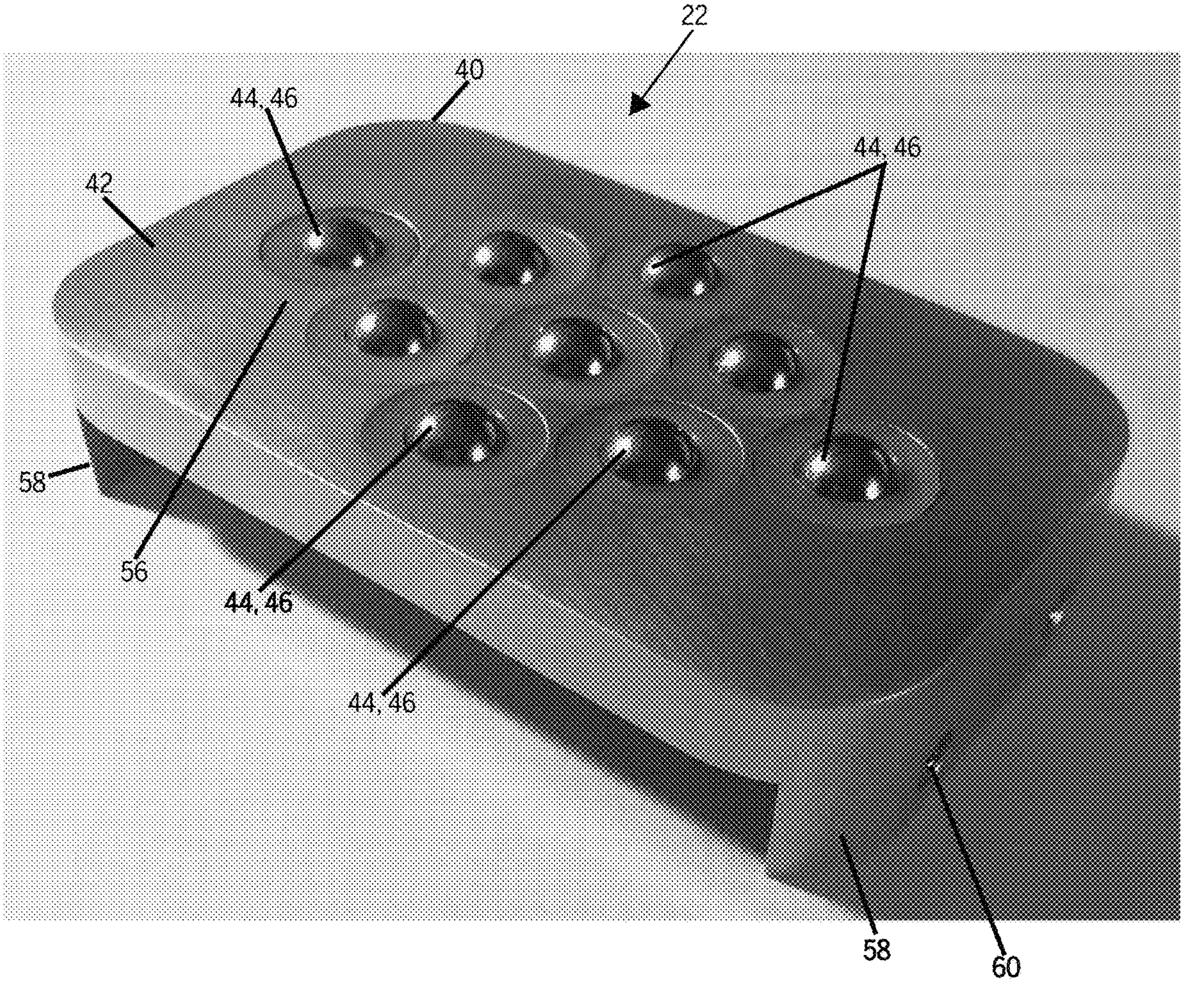
FIG. 2 is a photograph showing a perspective view of the drum-pedal module of this invention, which is the drum-pedal module affixed to the footboard of drum pedal apparatus of FIG. 1.
Figure 3:
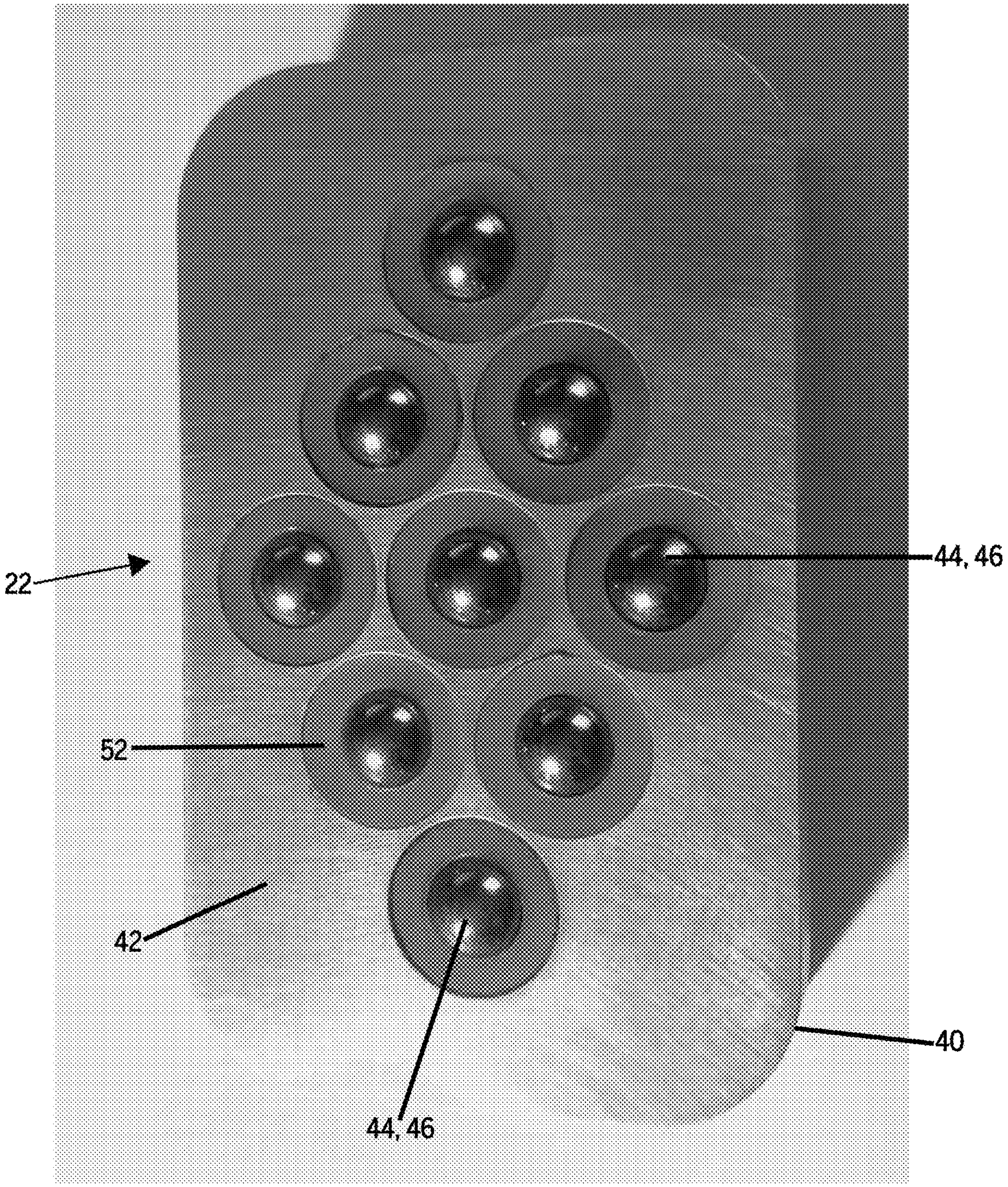
FIG. 3 is a photograph showing a top view of the drum-pedal module of FIG. 2.
Figure 4:
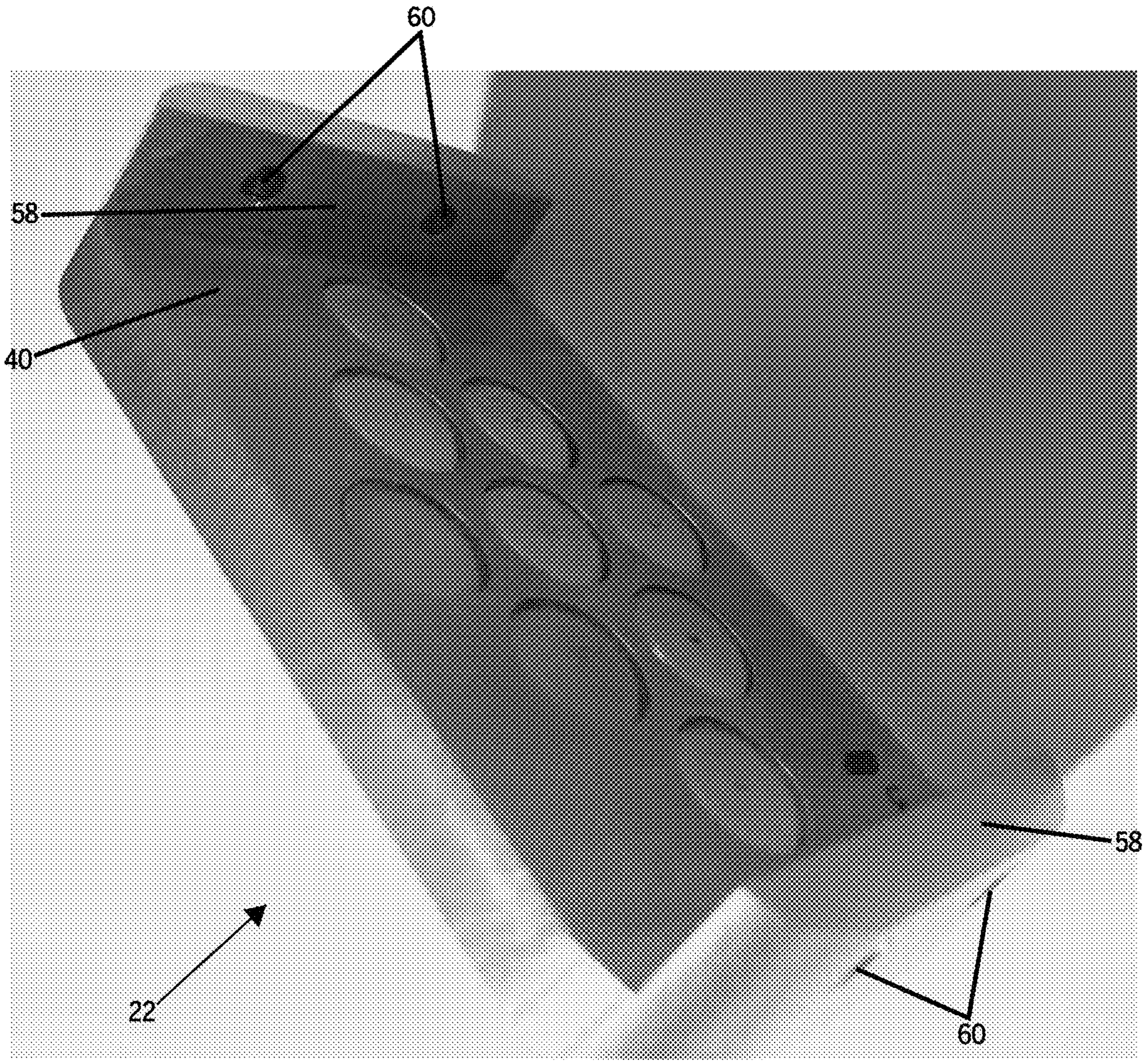
FIG. 4 is a photograph showing an underside perspective view of the drum-pedal module of FIG. 2.
Figure 5:
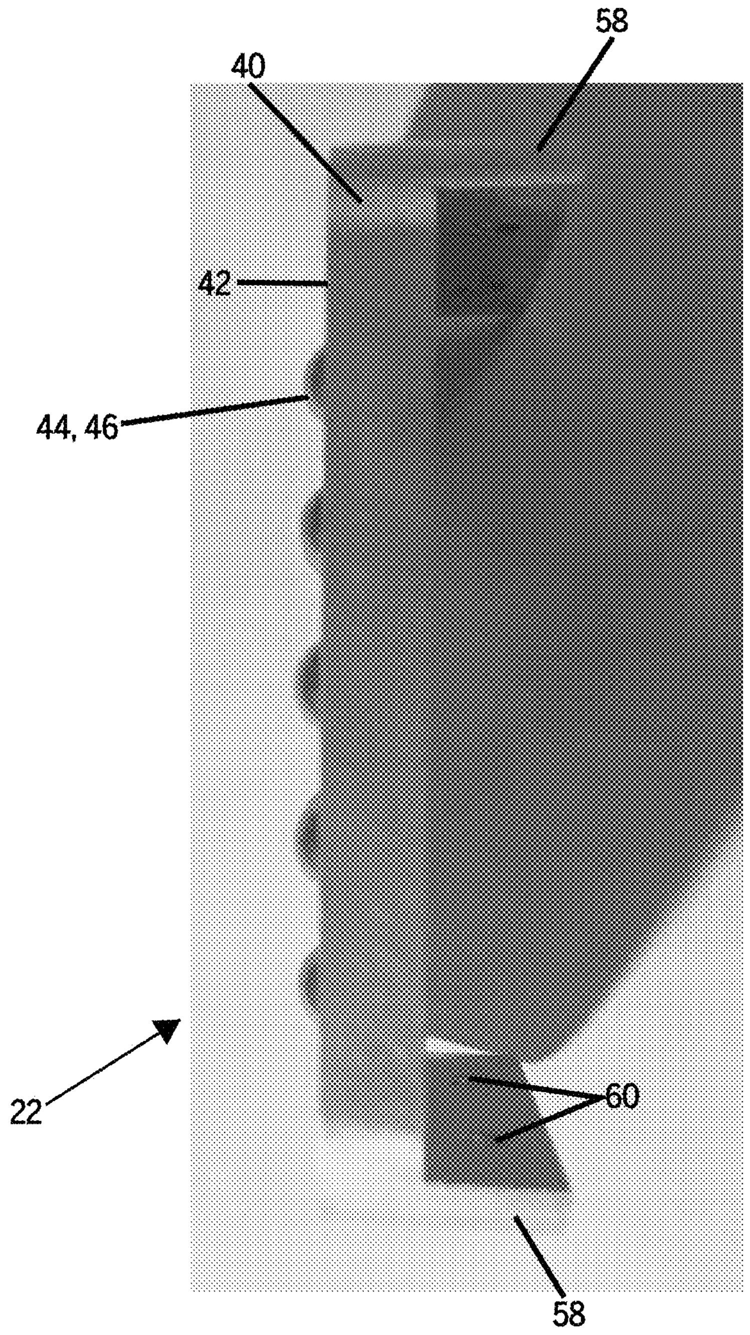
FIG. 5 is a photograph showing an end elevation view of the drum-pedal module of FIG. 2.
Figure 6:
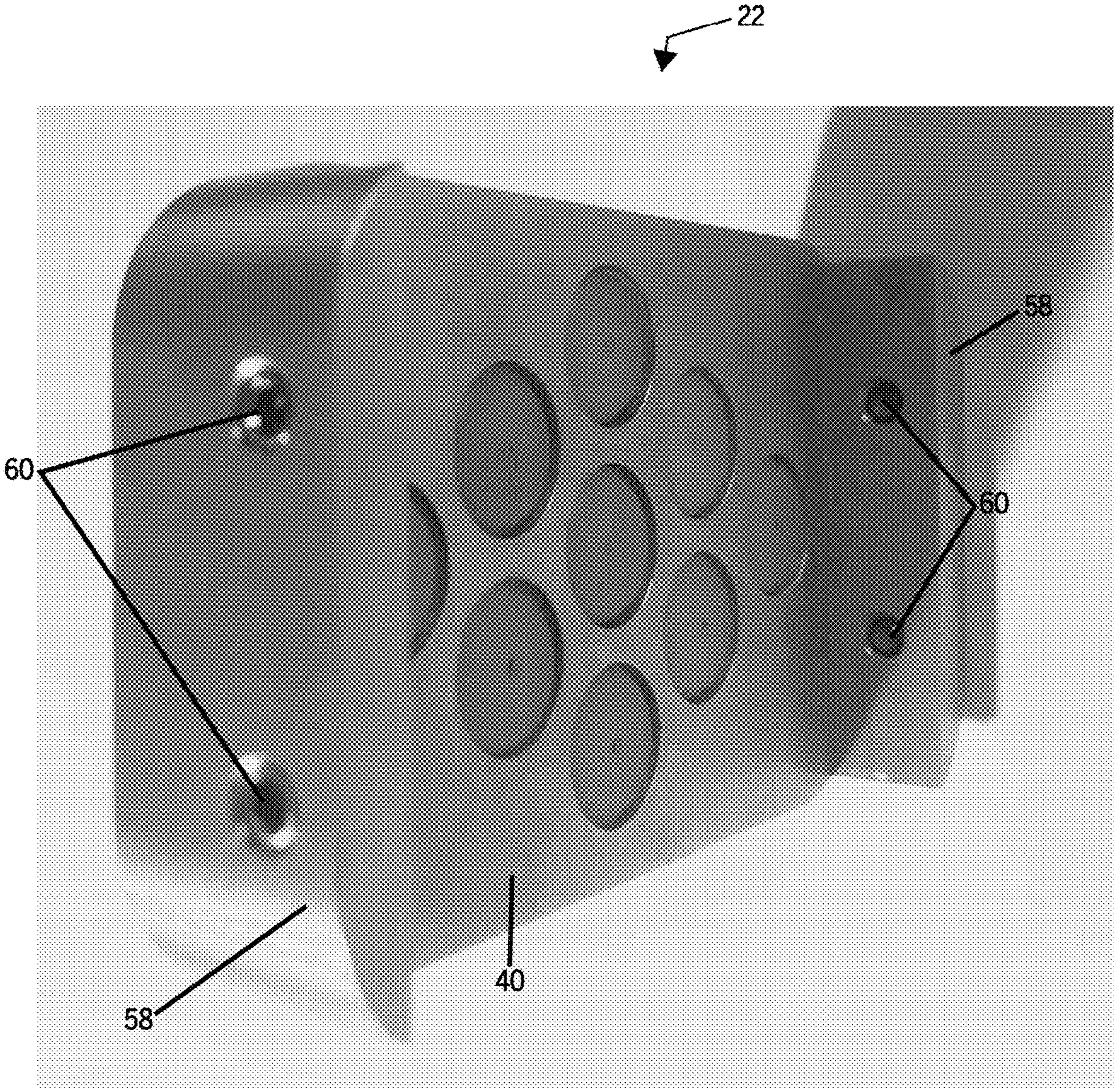
FIG. 6 is a photograph of another underside perspective view of the drum-pedal module of FIG. 2, this view more fully showing other aspects of the module.
Figure 7:
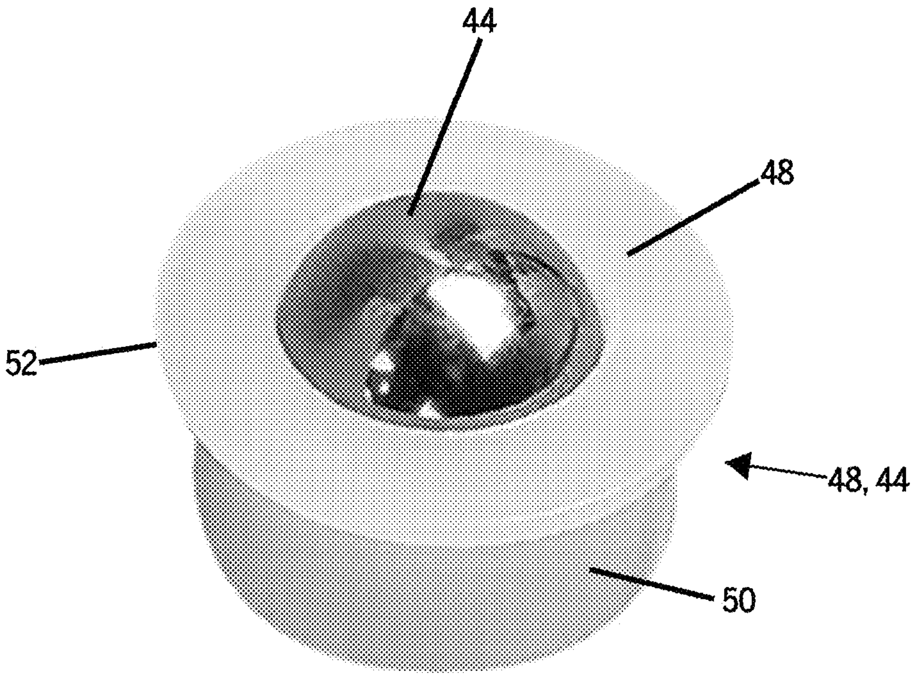
FIGS. 7 and 8 are photographs showing enlarged perspective views from differing angles of a preferred roller ball used in preferred embodiments of the invention, the ball being in its ball-encasement structure.

FIG. 1 illustrates drum pedal apparatus 20 which is one form of the improved drum pedal apparatus of this invention—this form having drum-pedal module 22 affixed onto the footboard of a standard drum pedal. In other words, this form of the drum pedal apparatus of the invention has a footboard structure which includes a standard footboard and drum-pedal module 22 affixed thereto. The prior art illustrated in the photos of FIGS. 10-13 provide more information on widely-used standard drum pedals.

The other form of the improved drum pedal apparatus of this invention, rather than an affixed module, has the roller-ball characteristics built into a main portion of the footboard structure. Instead of the normal footboard of such standard foot pedal apparatus, this form of the invention would have a footboard of sufficient thickness to accommodate the chosen roller balls and their appropriate ball-encasement structure secured within the footboard main portion. An additional drawing showing such additional form of this invention is not deemed essential for completeness of the disclosure of this form of the improved drum pedal apparatus of this invention.

FIGS. 1 and 10-13 illustrate the essential elements of standard foot-pedal apparatus. Such drum pedal apparatus include, among other things: a base 24 for placement or mounting on the floor or outdoor surface where a drummer is playing a bass drum; a footboard 26 depressably-mounted with respect to base 24 and movable between up and down positions by a drummer's foot; an axle support 28 forward of footboard 26 and having a striker axle 30 journaled therein for rotation by linkage 32 to footboard 26; a beater stem 34 affixed to striker axle 30 and extending to a beater 36 at its distal end; and spring apparatus 38 of various kinds which is configured and arranged to bias footboard 26 to non-depressed positions and beater 36 to non-striking positions.

The structure that characterizes the present invention has the footboard structure in the form of the invention shown in FIG. 1, including drum-pedal module 22, which will now be described. The footboard structure, and particularly its drum-pedal module, has a main portion 40 with upper surface 42 and a plurality of spherical roller balls 44 rotatably mounted within the thickness of main portion 40. The structure is done in a manner such that each roller ball 44 presents a spherical cap 46 and the spherical caps together provide a pedal-pushing surface. (Spherical caps 46 are seen best in FIGS. 2, 3, 5 and 7-9.) In other words, the pedal-pushing surface is or includes spherical caps 46 of roller balls 44.

Some of the characteristics and features of drum-pedal module 22 are regarded as important to the functional performance the invention, and these are now described. It is important that, for each spherical roller ball 44, less than the radius of roller ball 44 extend beyond main-portion upper surface 42; this means that spherical caps 46 of such roller balls 44 will be less than hemispheres which, as earlier noted, contributes to the roller ball's containment in its mounting within the thickness of main portion 40 of the footboard structure. But it has been found for highly preferred embodiments that, for each roller ball 44, about half or less than about half of the radius of the roller ball extends beyond the main-portion upper surface around such roller ball. This structure means, at least in theory, that each spherical cap 46, at the point it meets upper surface 42, will be at an angle sufficiently greater than normal (normal being 90 degrees) to minimize any non-downward interaction between the drummer's shoe surface and the pedal-pushing surface.

The plural roller balls useful for any embodiment of this invention can vary in size and still deliver the advantages of the invention. Having said that, it should also be noted that, at least for preferred embodiments, size ranges and other choices are important. Before getting more specific on preferred sizing of roller balls, it should first be noted that it is desirable that the plural roller balls of any drum pedal or drum-pedal module of this invention be of equal size, though it is verily believed that variation of roller-ball size within the plurality of roller balls of a roller-ball pattern can be done in useful ways. However, that subject will not be further dealt with in the present patent document.

A preferred size range for the equal-sized roller balls 44 of embodiments of this invention is the ball diameter being within the range of about 5-15 mm. Below this range is believed to create situations in which the drummer's shoe, particularly if its sole is irregular or too soft, may not properly interact with spherical caps 46 of the roller balls, and so may lose some of the value of this invention. A highly preferred size range has roller balls 44 with a diameter within the range of about 6-10 mm, which delivers excellent performance.

In this connection, it should be noted that particularly excellent performance is seen and appreciated when, based on roller-ball size and the dimensions of spherical cap 46, the extent to which the radii of roller balls 44 extend beyond upper surface 42 of main portion 40 is on the order of about 2 mm.

We turn now to how, for some particularly preferred embodiments, each of the plurality of roller balls 44 may be mounted within the thickness main portion 40. It has been found that spherical stainless steel roller balls, each having a diameter of about 8.5 mm and encased in a cylindrical ball-encasement structure 48, are readily immovably secured to main portion 40 in whatever pattern is intended. More specifically, such ball-encasement structures 48 may be made of nylon and have a cylindrical outer wall surface 50 of a diameter on the order of 12.5 mm. Such ball-encasement structures 48 further include a thin (approx. 1 mm thick) outward horizontal upper flange 52 at the upper edge thereof extending outwardly beyond outer wall surface 50 to a flange diameter on the order of 14.7 mm. These ball-encasement structures can be firmly inserted into holes drilled in main portion 40 that are sized to immovably accommodate ball-encasement structures 48 inserted therein.

Each cylindrical hole formed in main portion 40 that can each receive and hold a ball-encasement structure begins at upper surface 42 of main portion 40 and is supplemented by a machined flange-accepting void (not numbered in the drawings) at upper surface 42. This is done to allow the top surface of each upper horizontal nylon flange 52 of each ball-encasement structure 48 to be flush with upper surface 42 of main portion 40 of the drum-pedal module.

Figure 8:
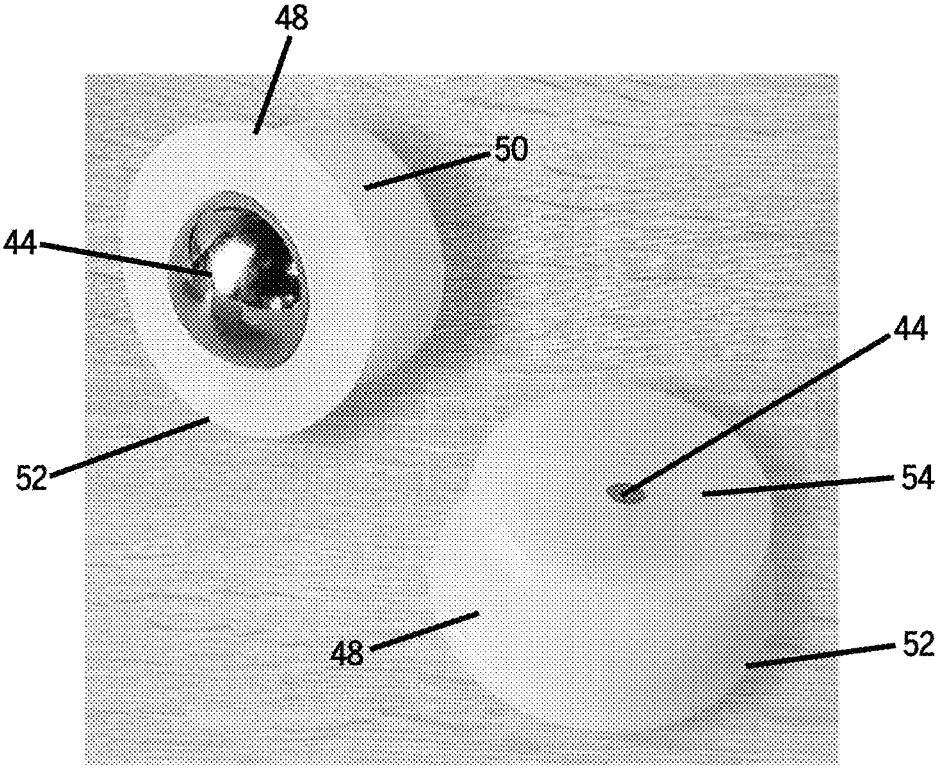
Figure 9:
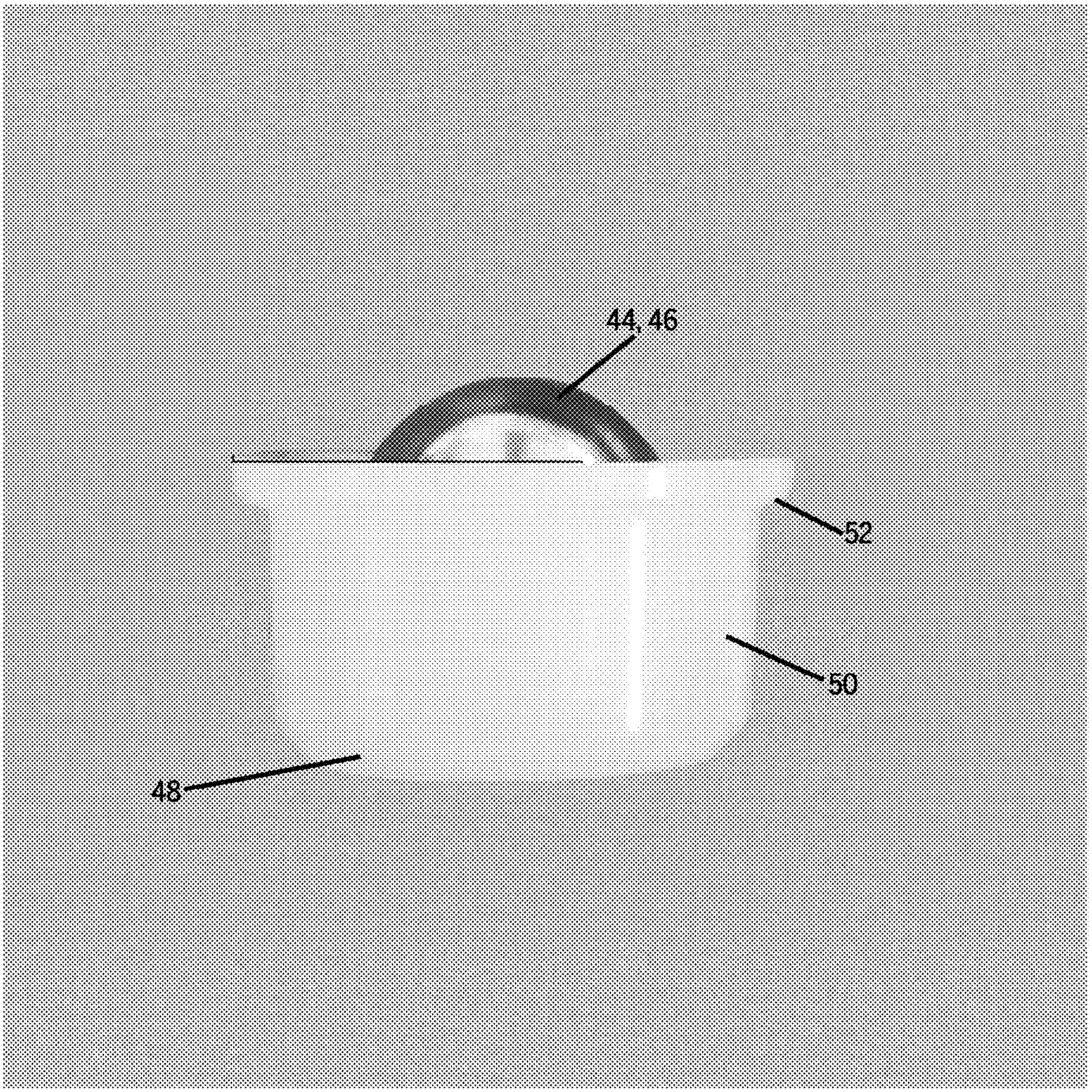
FIG. 9 is a photograph showing an enlarged side elevation of the roller ball and ball-encasement structure.
Figure 10:
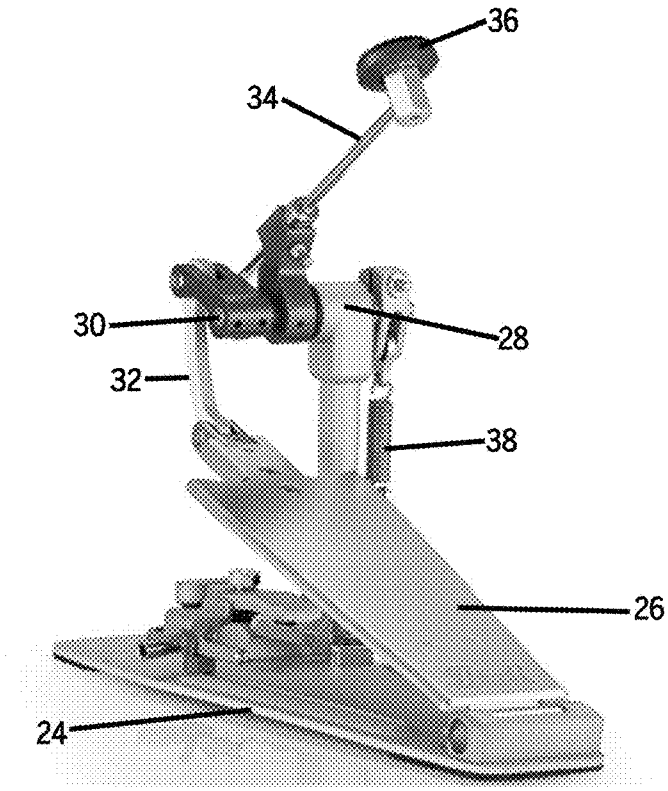
Figure 10 Prior Art
FIGS. 10 and 11 are photographs showing perspective views of a widely-used drum pedal apparatus of the prior art which one example of standard drum pedals on which the drum-pedal module of this invention can be affixed to provide a drum pedal apparatus of this invention.
Figure 11:
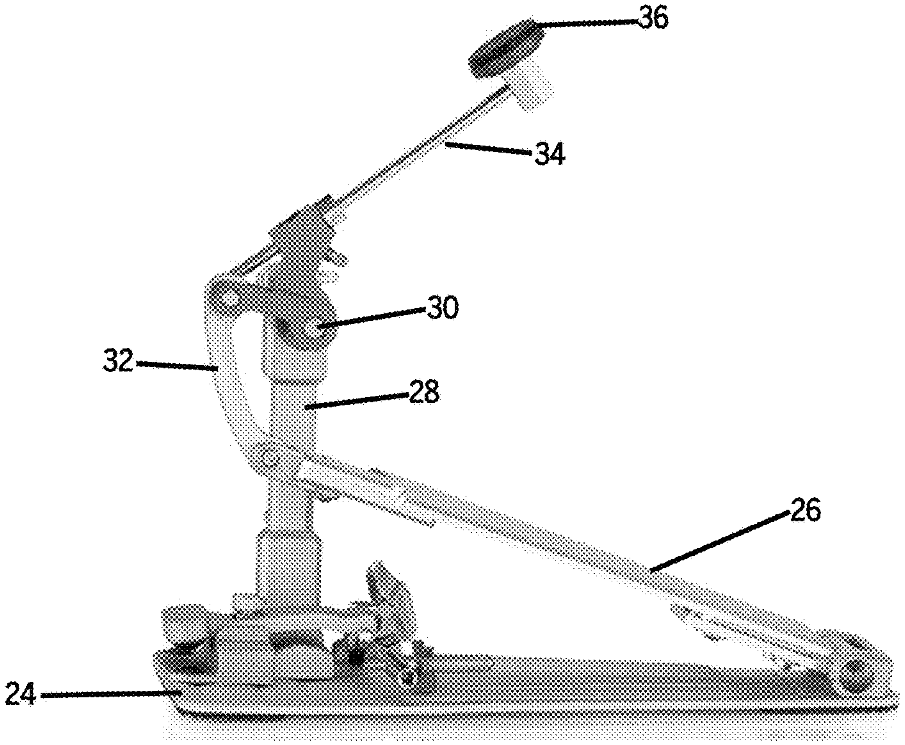
Figure 11 Prior Art
Figure 12:
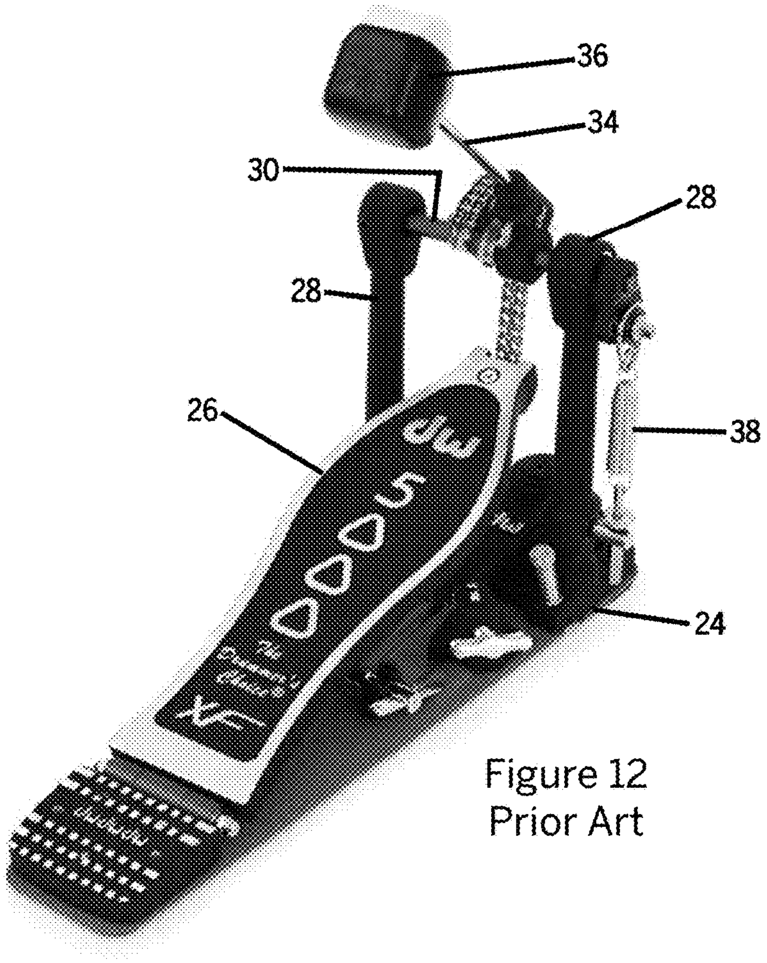
Figure 12 Prior Art
FIGS. 12 and 13 are photographs showing perspective views of another widely-used drum pedal apparatus of the prior art which yet another example of standard drum pedals on which the drum-pedal module of this invention can be affixed to provide a drum pedal apparatus of this invention.
Figure 13:
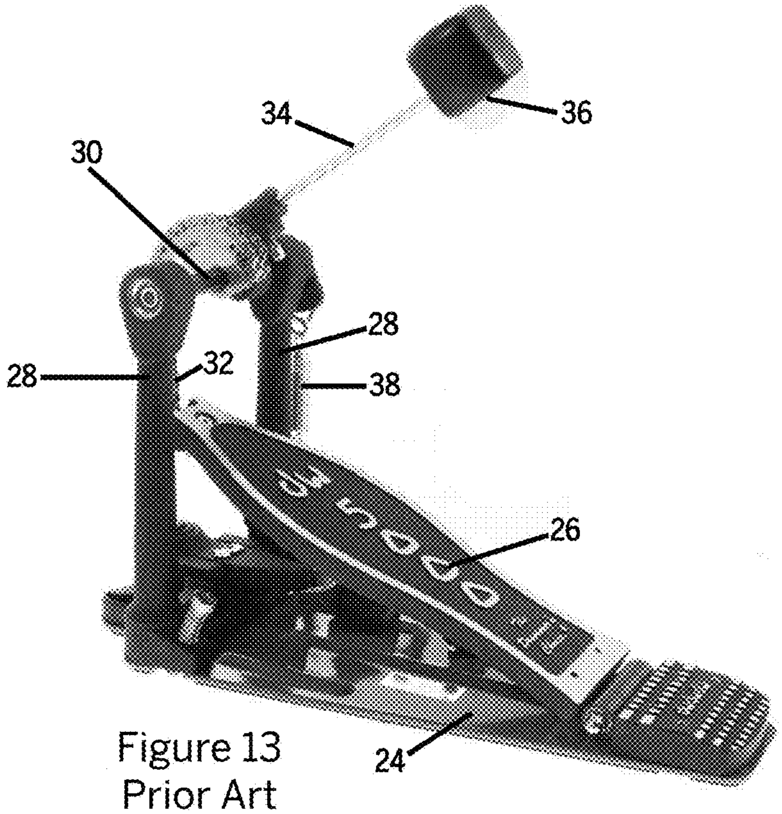
Figure 13 Prior Art

In such exemplary embodiment, each ball 44 within its nylon ball-encasement structure 48 is contained in free-turning condition, essentially unconstrained by its ball-encasement structure, but in no sense loose within such structure. In other words the mathematical center of each stainless steel ball 44 does not move, or at least does not appreciably move, but the ball-roller structure is allowed to easily perform its rolling function in engagement with the shoe on the drummer's drumming foot. FIG. 8 shows a bottom wall 54 of ball-encasement structure 48, and bottom wall 48 has a center hole on which roller ball 44 rests and is centered. As already noted, roller balls 44 are omni-directional, i.e., free rolling in whatever direction caused by the drummer's shoe contact.

In such exemplary embodiment, it should also be noted that the spherical caps 46 are sized such that the portion of the roller ball radius projecting above upper surface 42 and ball-encasement structure flanges 52 flush therewith is on the order of 2 mm, providing excellent interaction between the drummer's shoe and the pedal, to enhance the drummer's ease and speed of operation.

Referring still to the exemplary embodiment, one more dimension of roller ball 44 and ball-encasement structure 48 should be noted at this point, to facilitate descriptions of patterns of the plurality of roller balls 44 favored in certain preferred embodiments. The diameter of the base of spherical cap 46 of roller ball 44, i.e., the diameter thereof which is essentially the intersection of spherical cap 46 of the roller ball with the top surface of ball-encasement structure 48, is on the order of 7.7 mm, with the outer diameter of upper horizontal flange 52 being about 14.7 mm. This will be commented on further in descriptions of preferred patterns of the plurality of roller balls 44.

One suitable source for such roller balls in respective nylon ball-encasement structures is Shenzhen Chuangrong Technologies, a manufacturer that can be sourced in the United States.

Most, but not all, interaction of a drummer's foot with a drum pedal is between the portion of a drummer's shoe that is beneath the ball-of-the-foot portion of his or her foot. Accordingly, in certain preferred embodiments, roller balls 44 may be positioned such that spherical caps 46 are on what is or can be referred to as ball-of-the-foot portion 56 of the upper surface of the footboard structure. When the form of the invention is drum-pedal module 22 affixed onto footboard 26 of drum pedal apparatus, upper surface 42 of main portion 40 of drum-pedal module 22 and the encompassed spherical caps 46 can be or include ball-of-the-foot portion 56, and drum pedal module 22 can be affixed to footboard 26 of the drum pedal apparatus at any position desired by the drummer.

Referring now more specifically to the arrangement of roller balls 44 on upper surface 42 of main portion 40 of module 22 (or on footboard 26 itself), the plurality of roller balls 44 is preferably arranged in a two-dimensional pattern extending across and fore and aft along the ball-of-the-foot portion. This is shown best in FIGS. 1-3.

While not a requirement, it is preferred that roller balls 44 of the pattern be substantially equal in size to one another, that their spherical caps 46 are such that their broadest cross-dimensions substantially are equal in size to one another, and that each roller ball 44 is spaced from each of its adjacent roller balls by a substantially equal distance—a distance no more than slightly exceeding the broadest cross-dimension of spherical caps 46. The earlier-specified definition for "no more than slightly exceeding," as used with respect to the spacing of adjacent roller balls one from another in a pattern and relating such spacing to the broadest cross-dimension of the spherical caps 46 of each of two adjacent roller balls, considers what is regarded structurally sound engagement of ball-encasement structures 48 with main portion 40. In other words, if the holes formed for this purpose in main portion 40 are too close to one another, it is conceivable that this might involve some structural weakness.

In the exemplary embodiment shown in the figures, dimensions have been given above. Ball-encasement structures 48 have diameters of about 14.7 mm, and given that the broadest diameter of spherical caps 47 is on the order of 7.7 mm, and also that there is very small spacing (perhaps on the order of 1 mm) between adjacent ball-encasement structures, the spacing between adjacent roller balls is known. And, given that, in the context of the exemplary embodiment of this invention, it is reasonable to measure the spacing between adjacent roller balls 44 at the level of the broadest diameters of their spherical caps 46. With these things in mind, the "spacing between" adjacent roller balls in the exemplary embodiment is on the order of about 8 mm, closer spacing being difficult at best, given the full diameter of roller ball 44, the requirement of encasement, and the need for structural integrity and soundness of drum-pedal modules 22.

As noted earlier, while not a requirement, in one preferred arrangement the roller-ball pattern includes an offset arrangement of roller balls 44 ("offset arrangement" having been defined above). In such embodiments, it is particularly preferred that roller-balls 44 of the pattern have nine roller balls 44 in a diamond pattern with a central fore-aft linear row of three roller balls. This has been found particularly useful in facilitating easy engagement of the drummer's shoe with roller balls 44.

In preferred embodiments of drum-pedal module 22 for affixing to footboard 46 of drum pedal apparatus, main portion 40 of the module has a pedal-affixation structure thereon or therealong. Specifically, it is preferred that the pedal-affixation structure include a pair of flanges 58 projecting downwardly from the substantially horizontal portion of main portion 40 in position to extend along opposite lateral edges of footboard 26, as well as easy-to-use fasteners in the form of set screws 60 extending through and inwardly from downward flanges 58 toward the lateral edges of standard footboard 26. While downward flanges 58 may be parallel to one another, their spacing and the positions and length of set screws 50 therein are configured and arranged in order to affix drum-pedal module 22 to footboard 26, regardless of its profile or shape. Set screws 60 are easily used to sandwich module 22 securely on top of any standard footboard. It is preferred that downward flanges 58 be integrally formed with the remainder of module main portion 40.

While the omni-directional, free-rolling characteristics of roller balls 44 are highly preferred as the rotation elements in the present invention, the invention can also be seen in a broader aspect. In such aspect, drum pedal apparatus 20 and drum-pedal module 22, instead utilize a pattern of a plurality of rotation elements in other forms, but each rotatably mounted within the thickness of main portion 40 and each presenting an exposed rotating surface at a level above upper surface 42 of main portion 40. Such rotating elements may well each have an axis of rotation, and such axes of rotation being generally parallel to the footboard surface and extending horizontally across footboard 26, or across drum-pedal module 22, depending on the form of the invention. As earlier noted, it is believed that a plurality of this sort of rotational elements, while perhaps not as advantageous as roller balls 44, will suffice to provide advantages of this invention.

Throughout this specification, many details have been given to show how to make various embodiments of this invention. Additional information would be available to those skilled in the field of drum pedals who are made aware of this invention disclosure.

While the principles of this invention have been described in connection with specific embodiments, it should be understood clearly that these descriptions are made only by way of example and are not intended to limit the scope of the invention.

The invention claimed is:

1. In drum pedal apparatus including a base, a footboard depressably-mounted with respect to the base and movable between up and down positions, an axle support forward of the footboard and having a striker axle journaled therein for rotation by linkage to the footboard, a beater stem affixed to the striker axle and extending to a beater, spring apparatus biasing the footboard to non-depressed positions and the beater to non-striking positions, the improvement wherein the footboard comprises:

a footboard structure having a main portion with a thickness and a foot-engageable upper surface; and a plurality of roller balls rotatably mounted within the thickness of the main portion and each presenting a spherical cap extending above the foot-engageable upper surface, thereby providing a pedal-pushing foot-engageable surface including the roller-ball spherical caps.

2. The drum pedal apparatus of claim 1 wherein, for each roller ball, less than the radius of the roller ball extends above the main-portion upper surface, such that the spherical caps are less than hemispheres.

3. The drum pedal apparatus of claim 2 wherein, for each roller ball, about half or less than about half of the radius of the roller ball extends above the main-portion upper surface therearound.

4. The drum pedal apparatus of claim 1 wherein each of the roller balls has a diameter within the range of about 5-15 mm.

5. The drum pedal apparatus of claim 4 wherein each of the roller balls has a diameter within the range of about 6-10 mm.

6. The drum pedal apparatus of claim 5 wherein, for each roller ball, the portion of its radius extending above the main-portion upper surface therearound is about 2 mm.

7. The drum pedal apparatus of claim 1 wherein the roller balls are free-rolling balls such that they roll freely as directed by foot contact without regard to any axis of rotation.

8. The drum pedal apparatus of claim 1 wherein the main-portion upper surface includes a ball-of-the-foot portion, and the plurality of roller balls are positioned at such ball-of-the-foot portion.

9. The drum pedal apparatus of claim 8 wherein the plurality of roller balls is arranged in a two-dimensional pattern extending across and fore and aft along the ball-of-the-foot portion.

10. The drum pedal apparatus of claim 9 wherein:

the roller balls are substantially equal in size;

the spherical caps have their broadest cross-dimensions substantially equal in size; and each roller ball is spaced from each of its adjacent roller balls by a substantially equal distance no more than slightly exceeding the broadest cross-dimension of the spherical caps.

11. The drum pedal apparatus of claim 10 wherein the roller-ball pattern includes an offset arrangement of roller balls.

12. The drum pedal apparatus of claim 10 wherein the roller-ball pattern has nine roller balls in a diamond pattern with a central fore-aft linear row of three roller balls.

13. A drum-pedal module for affixing onto the footboard of drum pedal apparatus, the module comprising:

a main portion for placing across the footboard, the main portion having a thickness and a foot-engageable module upper surface;

pedal-affixation structure on or along the module main portion; and a plurality of roller balls rotatably mounted within the thickness of the main portion and each presenting a spherical cap extending above the foot-engageable upper surface, thereby providing a pedal-pushing foot-engageable surface.

14. The drum pedal module of claim 13 wherein the pedal-affixation structure comprises:

a pair of flanges projecting downwardly from the module main portion in position to extend along opposite lateral edges of the footboard; and fasteners extending inwardly from the flanges toward the lateral edges of the footboard to affix the module to the footboard.

15. The drum pedal module of claim 14 wherein the fasteners are a plurality of set screws extending through the flanges.

16. The drum pedal module of claim 13 wherein the pair of flanges of the pedal-affixation structure are integrally formed with the module main portion.

17. The drum pedal module of claim 16 wherein the fasteners are a plurality of set screws extending through the flanges.

18. In drum pedal apparatus including a base, a footboard depressably-mounted with respect to the base and movable between up and down positions, an axle support forward of the footboard and having a striker axle journaled therein for rotation by linkage to the footboard, a beater stem affixed to the striker axle and extending to a beater, spring apparatus biasing the footboard to non-depressed positions and the beater to non-striking positions, the improvement wherein the footboard comprises:

a footboard structure having a main portion with a thickness and a foot-engageable upper surface; and a plurality of roller balls rotatably mounted within the thickness of the main portion, each spaced from each of its adjacent roller balls and each presenting an exposed rotatable surface at a level above the upper surface of the module main portion therearound, thereby providing a pedal-pushing foot-engageable surface that includes the combination of exposed rotatable surfaces and the upper surface around each exposed rotatable surface.

* * * * *